United States Patent [19]
Hamada

[11] Patent Number: 4,766,480
[45] Date of Patent: Aug. 23, 1988

[54] INTEGRATED CIRCUIT CARD HAVING MEMORY ERRASABLE WITH ULTRAVIOLET RAY

[75] Inventor: Yoshitaka Hamada, Kawasaki, Japan

[73] Assignee: Mips Co., Ltd., Tokyo, Japan

[21] Appl. No.: 96,318

[22] Filed: Sep. 9, 1987

Related U.S. Application Data

[63] Continuation of Ser. No. 804,476, Dec. 4, 1985, abandoned.

[30] Foreign Application Priority Data

May 16, 1985 [JP] Japan .............................. 60-72914[U]

[51] Int. Cl.⁴ ..................... H01L 23/08; H01L 23/18; H01L 23/30
[52] U.S. Cl. ..................................... 357/74; 357/72; 357/73
[58] Field of Search ....................... 357/72, 80, 73, 74; 235/492, 487, 443; 174/52 FP

[56] References Cited

U.S. PATENT DOCUMENTS

| | | |
|---|---|---|
| 3,699,311 | 10/1972 | Dunbar . |
| 3,702,464 | 11/1972 | Castrucci . |
| 3,719,804 | 3/1973 | Illing . |
| 3,876,865 | 4/1975 | Bliss . |
| 3,928,750 | 12/1975 | Wölflingseder . |
| 4,326,214 | 4/1982 | Trueblood ............................ 357/74 |
| 4,361,756 | 11/1982 | Parmentier ......................... 235/492 |
| 4,423,317 | 12/1983 | Berezowski et al. . |
| 4,460,915 | 7/1984 | Engel .................... 357/74 |
| 4,532,419 | 7/1985 | Takada ................ 235/492 |
| 4,550,248 | 10/1985 | Hoppe et al. ....................... 235/487 |

FOREIGN PATENT DOCUMENTS

| | | | |
|---|---|---|---|
| 0121268 | 10/1984 | European Pat. Off. .............. 357/72 |
| 2337381 | 7/1977 | France . |
| 0207656 | 12/1983 | Japan .................... 357/72 |
| 0167037 | 9/1984 | Japan .................... 357/72 |
| 0076151 | 4/1985 | Japan .................... 357/72 |

OTHER PUBLICATIONS

Patent Abstracts of Japan, vol. 9, No. 113; May 17, 1985, pp. 110 & 356; and JP-A-60 589, (Kiyoudou Insatsu K.K.) 5-01-1985.

Primary Examiner—Andrew J. James
Assistant Examiner—S. V. Clark
Attorney, Agent, or Firm—Birch, Stewart, Kolasch & Birch

[57] ABSTRACT

An IC card having a built-in IC chip within its thickness includes a window for exposing the IC chip to ultraviolet rays. The window has ultravoilet-ray-permeable material placed in a position corresponding to the built-in chip on the surface of the card. The ultraviolet-ray-permeable material placed over the window protects the built-in IC chip from contamination due to dirt, and also from damage due to contact with objects external to the card.

2 Claims, 1 Drawing Sheet

INTEGRATED CIRCUIT CARD HAVING MEMORY ERRASABLE WITH ULTRAVIOLET RAY

This application is a continuation of application Ser. No. 804,476 filed on Dec. 4, 1985, now abandoned.

BACKGROUND OF THE INVENTION

1. Field of the Invention

The present invention relates to an integrated circuit card, and more particularly to an integrated circuit card having a memory. Information stored in this memory is erasable by ultraviolet rays. This integrated circuit card is for use in an electronic arrangement, such as a personal or hand-held computer, and a TV game machine.

2. Description of the Prior Art

An integrated circuit (IC) card consists of a compact, thin, inflexible card body typically measuring about 85.6 mm long, 54 mm wide, and 0.8–2.0 mm thick. An IC chip (semiconductor integrated circuit device) having desired functions is built into a rigid or semi-rigid card body made of plastic or reinforced cardboard, and numerous connecting terminals are arranged along an edge on the surface of the card.

When the card is inserted into a card receiving slot on a piece of electronic equipment such as a personal computer, hand-held computer, or a TV game machine, the terminals on the card are electrically connected to the associated terminals on the connectors of the electronic equipment, that is, the IC circuit on the card is connected to the circuitry in the electronic equipment so that information may be transferred between them.

Information carried on the IC chip can be erased by subjecting the IC chip to ultraviolet rays. Afterward, new information may be rewritten by means of an input head. However, until now, it has not been possible to erase information stored in the chip incorporated into the thickness of the IC card because of its structure and material. No IC cards that allow their integrated IC chips to be exposed to ultraviolet ray have existed before. Although exposure of the built-in chip by disassembly may allow ultraviolet radiation erasure, the card cannot actually be disassembled easily. If the card is partially disassembled, the IC card may often be damaged, because the printed circuit board with the IC chip installed is firmly fixed to the card body with adhesive.

SUMMARY OF THE INVENTION

It is, therefore, an object of the present invention to provide an integrated circuit card having an IC chip built therein which is able to be subjected to ultraviolet rays without disassembly in order to erase information stored in the IC chip.

The foregoing object is accomplished by installing a window to allow exposure of the IC chip to ultraviolet rays and by utilizing ultraviolet-ray-permeable material placed in a position corresponding to the built-in chip on the surface of the card.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only, and thus not limitative of the present invention and in which.

DESCRIPTION OF THE PREFERRED EMBODIMENT

Figure 1:
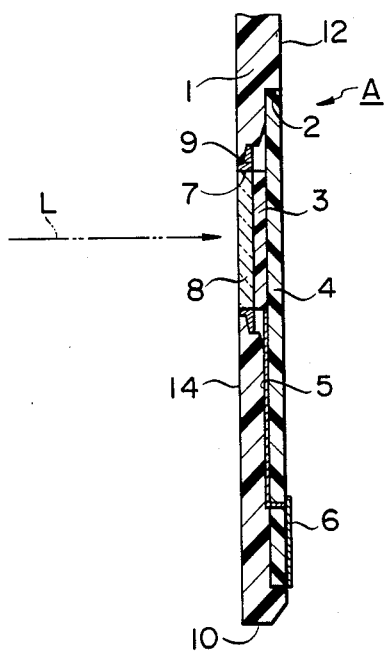
FIG. 1 is an enlarged longitudinal cross-sectional view of the major portion of an integrated circuit card cut along the line I—I shown in FIG. 2.
Figure 2:
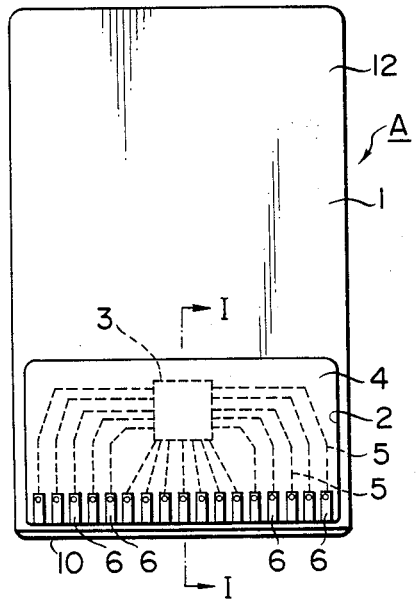
FIG. 2 is a face plan view showing an embodiment of an integrated circuit card in accordance with the present invention.
Figure 3:
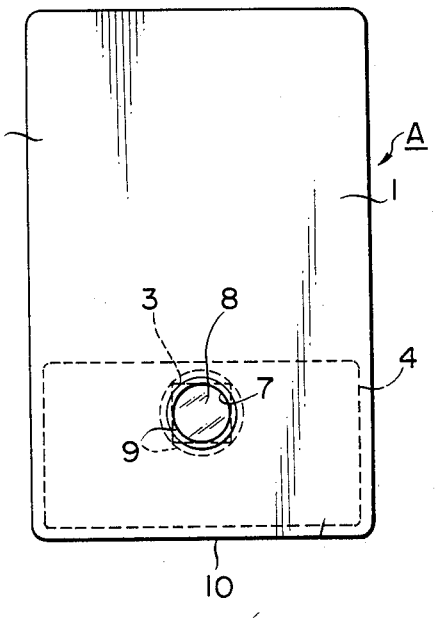
FIG. 3 is a back plan view of the embodiment.

Referring to FIGS. 1, 2 and 3 an IC card A of this embodiment has a rectangular hollow 2 positioned near an edge 10 of a primary surface 12 of a card body 1, into which the a printed circuit board 4 with an IC chip 3 is inserted with its surface carrying IC chip 3 oriented to the bottom of hollow 2, and fixed with adhesive. Thus, the IC chip 3 is built into the thickness of the card body 1.

In the illustrative embodiment, IC chip 3 includes a memory of the type, in which information stored is erasable with ultraviolet rays irradiated thereupon. A board 4 having a first and second side has wire connections 5 printed on the second side for interconnecting the circuitry included in chip 3 to connector terminals 6. Printed metal terminals 6 are disposed along the edge 10 on the surface of the printed circuit board 4 which does not carry IC chip 3, and are connected to the associated printed wires 6 via throughholes, as shown in FIG. 1.

When the IC card A is inserted into a card receiving slot on a piece of electronic equipment, not shown, the terminals 6 come in contact with the associated terminals on the connectors of the electronic equipment, that is, the IC chip on the card A is connected to the circuitry in the electronic equipment.

A window 7 for exposure of the IC chip 3 to ultraviolet rays is located at a position corresponding to the built-in IC chip 3 on the back face or other primary surface 14 of the card body 1. At the window 7, an ultraviolet-ray-permeable member 8, which is substantially permeable to ultraviolet rays and preferably made of material such as glass, mica, ultraviolet-ray-permeable resin (e.g., fluorine plastics), is placed to pass incoming ultraviolet rays into the inside of window 7. In this embodiment, the member 8 is assembled to the frame 9 beforehand. The assembly is placed onto the window 7 from the hollow 2 side and then fixed with adhesive before the printed circuit board 4 with the IC chip 3 is installed.

Since the IC card A of this illustrative embodiment is of the foregoing structure, an ultraviolet radiation head, not shown, is aligned with the exposure window 7 when erasure of information stored in the IC chip 3 is desired. Then, the ultraviolet rays L emitted from the head strike the IC chip 3 through the ultraviolet-ray-permeable material 8 of the window 7. By so doing, the built-in IC chip 3 is subjected to ultraviolet rays L without disassembly of the card A, to erase information stored in the IC chip 3. The ultraviolet-ray-permeable material 8 placed over the window 7 protects the built-in IC chip 3 from contamination due to dirt, and also from damage due to contact with objects external to the card A.

As stated in the above, radiation of ultraviolet rays L from an erase head to the built-in IC chip 3 through the window 7 with the member 8 allows information stored in the memory included in IC chip 3 to be erased. The member 8 placed over the window 7 protects the built-in IC chip 3 from contamination due to dirt, and also from damage due to contact with objects external to the card A.

As can be seen form the above description, an advantage of this invention is that information stored in an IC memory carried on an IC card can be erased at any time without disassembly of the card, by exposing the built-in IC chip to ultraviolet rays.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An integrated circuit card for use in an electronic arrangement, said card being capable of being received in a slot of said electronic arrangement, said slot having a plurality of mating connection terminals therein, said integrated circuit card comprising:

a card body having a flat rectangular shape and a first and second primary surface, said first primary surface having a recess formed therein;

a printed circuit board being mounted in said recess of said card body, said circuit board having a first and second side, said circuit board being mounted in said recess in a manner to permit said first side of said printed circuit board to form a flat, continuous surface with the first primary surface of said card body;

an integrated circuit chip being carried on the second side of said printed circuit board and including a memory capable of storing information which can be erased by ultraviolet rays irradiated thereupon, said chip being adhered to said circuit board and encapsulation by a molding adhesive;

a window being formed in the second primary surface of said card body to communicate with said recess, said window being located adjacent to the printed circuit board when said board is mounted in said recess of said card body, said window being smaller in size than said recess, and having an edge tapered in the direction from the second side of said circuit board to the second primary surface of said card body;

a plate for covering said window, said plate being made from material which is permeable to ultraviolet rays, said plate being positioned in said window to permit ultraviolet rays to pass through the window and to reach the integrated circuit chip to thereby erase any information stored in said memory of the integrated circuit chip;

a frame having an outer edge tapered to mate with the tapered edge of said window for carrying said plate;

a plurality of connection terminals extending along an edge of the first primary surface of the card body, said plurality of connection terminals establishing electrical connections with said plurality of mating connection terminals of said electronic arrangement when said card is received in said slot; and a plurality of connection wires being mounted on the second side of said printed circuit board, each said connection terminal having a connection wire extending therefrom to the integrated circuit chip through throughholes formed in the printed circuit board, said plurality of connection wires serving to connect said integrated circuit chip with the connection terminals.

2. An integrated circuit card in accordance with claim 1, wherein said plate comprises a material selected from a group including glass, mica and ultraviolet-ray-permeable resin.

* * * * *